United States Patent
Hollis et al.

(12)

(10) Patent No.: US 6,811,318 B1
(45) Date of Patent: Nov. 2, 2004

(54) OPTICAL CONNECTOR INCORPORATING A SHUTTER ASSEMBLY AND RELATED METHOD

(75) Inventors: Dale R. Hollis, Thousand Oaks, CA (US); Simon H. Wu, Alhambra, CA (US)

(73) Assignee: Reynolds Industries, Inc., Los Angeles, CA (US)

( * ) Notice: Subject to any disclaimer, the term of this patent is extended or adjusted under 35 U.S.C. 154(b) by 0 days.

(21) Appl. No.: 10/449,172

(22) Filed: May 28, 2003

(51) Int. Cl.[7] .............................................. G02B 6/36
(52) U.S. Cl. ....................................................... 385/53
(58) Field of Search ............................... 385/53, 56–60

(56) References Cited

U.S. PATENT DOCUMENTS

| | | | |
|---|---|---|---|
| 5,598,495 A | 1/1997 | Rittle et al. .................... 385/75 |
| 6,108,482 A | 8/2000 | Roth ........................... 385/139 |
| 6,240,229 B1 | 5/2001 | Roth ............................ 385/53 |
| 6,264,374 B1 | 7/2001 | Selfridge et al. ............. 385/78 |

Primary Examiner—Javaid H. Nasri
(74) Attorney, Agent, or Firm—Sheppard, Mullin, Richter & Hampton LLP

(57) ABSTRACT

A shutter assembly including first and second flexible layers and first and second coupling rings. Both the first and second flexible layers have a plurality of slits. When the shutter assembly is in a closed position, the first and second flexible layers are substantially planar, the second flexible layer is located adjacent to the first flexible layer, a longitudinal axis perpendicularly passes through the first flexible layer, the first flexible layer's slits meet at a first location, and the second flexible layer's slits meet at a second location, laterally spaced from the first location. Both the first and second flexible layers are located between the first and second coupling rings, which support the flexible layers with a sealed space located behind the flexible layers. Both the first and second flexible layers form a seal with a optical device when the shutter assembly is in an open position.

20 Claims, 3 Drawing Sheets

OPTICAL CONNECTOR INCORPORATING A SHUTTER ASSEMBLY AND RELATED METHOD

FIELD OF THE INVENTION

The invention relates generally to the field of connectors. More specifically, the invention relates to an optical connector incorporating a shutter assembly for excluding dust and other contaminants.

BACKGROUND OF THE INVENTION

Optical connectors terminate fiber-optic cables and often are used to facilitate the interconnection of fiber-optic cables, which encase optical fibers. Optical connectors also are used to facilitate the interconnection of fiber-optic cables and devices that transmit and/or receive optical signals. Typically, an optical connector includes a housing, which encloses one end of a fiber-optic cable that is coupled to a ferrule. When two optical connectors are connected together, the ferrules within the optical connectors interface with one another. Similarly, when an optical connector is connected to an optical device, the ferrule within the optical connector interfaces with optical components included in the optical device.

However, when the optical connector is not coupled to another optical connector or device, the optical connector's housing is open and the ferrule is exposed to dust, dirt, and other contamination from outside of the housing. Exposure of the ferrule to contaminants is disadvantageous because such exposure can result in the contaminants depositing on the ferrule, and can adversely affect the optical path between the ferrule and another adjacent ferrule or other optical device. In particular, contaminants can attenuate or block the optical transmission capabilities both into and out of the ferrule. Accordingly, contaminants must be periodically removed from the ferrule. The removal of contaminants can be time consuming and can result in abrasions or other damage to the ferrule's highly-polished surface. Another concern related to the ferrule being open to the environment outside of the housing, is protecting the user from exposure to high-intensity light emitted from the ferrule.

Prior efforts to limit the amount of time that the ferrule is exposed to the environment outside of the optical connector's housing have resulted in the use of dust covers and end caps to seal optical-connector housings. Also, rigid shutters having an iris, like that of a camera, have been used. Other rigid shutters that pivot into and out of a sealing position also have been used. However, the removal of dust covers or end caps requires additional manual effort by the user. Furthermore, after the dust covers and end caps are removed, the optical connector's housing is open and the ferrule is exposed to the environment outside of the housing. A similar problem occurs with the use of rigid shutters, since the ferrule again is exposed to the environment outside of the housing after the shutter is opened. Rigid shutters also pose the problem of contact between the ferrule and the rigid shutter which may result in the highly-polished surface of the ferrule being scratched or broken. Furthermore, a rigid shutter may provide regions where dust accumulates, and thus, may contribute to contamination of the ferrule should it contact the rigid shutter.

Accordingly, there is a need for an optical connector that can be mated and unmated with other optical connectors or optical devices with a low risk of damage to the ferrule and with little to no exposure of the ferrule to the environment outside of the optical connector's housing. The present invention satisfies these needs.

SUMMARY OF THE INVENTION

The present invention is embodied in a shutter assembly used in an optical connector, which can be mated and unmated with other optical connectors or optical devices with a low risk of damage to the ferrule and with little to no exposure of the ferrule to the environment outside of the optical connector. More particularly, an exemplary system that embodies the invention is a shutter assembly configured to be moveable between a closed position, when an optical device is not inserted into the shutter assembly, and an open position, when the optical device is inserted into the shutter assembly. The shutter assembly includes a first flexible layer, second flexible layer, first coupling ring, and second coupling ring. The first flexible layer has a plurality of slits formed therein, wherein, when the shutter assembly is in the closed position, the first flexible layer is substantially planar, a longitudinal axis perpendicularly passes through the first flexible layer, and the first flexible layer's slits meet at a first location. The second flexible layer has a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location. The first coupling ring is located adjacent to the first flexible layer, and the second coupling ring is located adjacent to the second flexible layer. Both the first and second flexible layers are located between the first and second coupling rings. The first and second coupling rings support the first and second flexible layers with a sealed space located behind the first and second flexible layers. Both the first and second flexible layers form a seal with the optical device when the shutter assembly is in its open position.

In other, more detailed features of the invention, each of the slits included in the first flexible layer's plurality of slits extends radially from the first location, and each of the slits included in the second flexible layer's plurality of slits extends radially from the second location. Also, both the first and second coupling rings are c-shaped. In addition, the shutter assembly is configured to exclude contaminants from the sealed space located behind the first and second flexible layers. Furthermore, the first and second flexible layers are made of high-resilience silicone rubber.

In other, more detailed features of the invention, the shutter assembly further includes a third flexible layer and a fourth flexible layer. The third flexible layer has a plurality of slits formed therein, wherein, when the shutter assembly is in a closed position, the third flexible layer is located adjacent to the second flexible layer, the third flexible layer is substantially planar, and the third flexible layer's slits meet at a third location, laterally spaced from both the first and second locations. The fourth flexible layer has a plurality of slits formed therein, wherein, when the shutter assembly is in a closed position, the fourth flexible layer is located adjacent to the third flexible layer, the fourth flexible layer is substantially planar, and the fourth flexible layer's slits meet at a fourth location, laterally spaced from the first, second, and third locations. The second coupling ring is located adjacent to the fourth flexible layer. The first, second, third, and fourth flexible layers are located between the first and second coupling rings, and the first and second coupling rings support the first, second, third, and fourth flexible layers with the sealed space located behind the first, second, third, and fourth flexible layers. The first, second, third, and fourth flexible layers form the seal with the optical device when the shutter assembly is in its open position. Also, each of the slits included in the third flexible layer's plurality of slits extends radially from the third location, and each of the slits included in the fourth flexible layer's plurality of slits extends radially from the fourth location.

Another exemplary system that embodies the invention is an optical connector configured to be matable with an optical device. The optical connector includes a housing and a shutter assembly. The housing defines a cavity having a longitudinal axis and an opening. A ferrule is located generally coaxially within the cavity and recessed from the opening. The ferrule optically engages the optical device when the optical connector mates with the optical device. The shutter assembly is located within the cavity, adjacent to the opening. The shutter assembly is configured to be moveable between a closed position, when the optical connector and the optical device are not mated with each other, and an open position, when the optical connector and the optical device are mated with each other. The shutter assembly functions to seal the cavity, both in the closed and open positions. The shutter assembly includes a first flexible layer, second flexible layer, first coupling ring, and second coupling ring. The first flexible layer has a plurality of slits formed therein, wherein, when the shutter assembly is in the closed position, the first flexible layer is substantially planar and the first flexible layer's slits meet at a first location. The second flexible layer has a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location. The first coupling ring is located adjacent to the first flexible layer, and the second coupling ring is located adjacent to the second flexible layer. Both the first and second flexible layers are located between the first and second coupling rings. Also, the first and second coupling rings support the first and second flexible layers with a sealed space located behind the first and second flexible layers.

Another exemplary system that embodies the invention is an optical connector pair that includes a plug assembly and a receptacle assembly. The plug assembly includes a plug housing defining a cavity having a longitudinal axis and an opening. The plug assembly further includes a plug ferrule located generally coaxially within the cavity and recessed from the plug housing's opening. The receptacle assembly includes a receptacle housing defining a cavity having a longitudinal axis and an opening. The receptacle assembly further includes a receptacle ferrule located generally coaxially within the cavity, recessed from the receptacle housing's opening. The plug assembly and the receptacle assembly are configured to be matable with each other, with the plug ferrule optically engaging the receptacle ferrule. The plug assembly further includes a plug shutter assembly located within the plug housing's cavity, adjacent to the plug housing's opening. The receptacle assembly further includes a receptacle shutter assembly located within the receptacle housing's cavity, adjacent to the receptacle housing's opening. Both the plug shutter assembly and the receptacle shutter assembly are configured to be movable between a closed position, when the plug assembly and receptacle assembly are not mated with each other, and an open position, when the plug assembly and the receptacle assembly are mated with each other. Both the plug shutter assembly and the receptacle shutter assembly function to seal their respective cavities, both in their closed positions and their open positions. The plug shutter assembly and the receptacle shutter assembly each include a first flexible layer, second flexible layer, first coupling ring, and second coupling ring. The first flexible layer has a plurality of slits formed therein, wherein, when the shutter assembly is in the closed position, the first flexible layer is substantially planar and the first flexible layer's slits meet at a first location. The second flexible layer has a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location. The first coupling ring is located adjacent to the first flexible layer, and the second coupling ring is located adjacent to the second flexible layer. Both the first and second flexible layers are located between the first and second coupling rings, and the first and second coupling rings support the first and second flexible layers with a sealed space located behind the first and second flexible layers.

An exemplary method that embodies the invention is a method for interfacing an optical connector pair. The method includes providing a plug assembly including a plug housing defining a cavity having a longitudinal axis and an opening. The plug assembly further includes a plug ferrule located generally coaxially within the cavity and recessed from the plug housing's opening. The method also includes providing a receptacle assembly including a receptacle housing defining a cavity having a longitudinal axis and an opening. The receptacle assembly further includes an alignment sleeve and a receptacle ferrule located within the alignment sleeve generally coaxially within the cavity and recessed from the receptacle housing's opening. The plug assembly and the receptacle assembly are configured to be matable with each other, with the plug ferrule optically engaging the receptacle ferrule within the alignment sleeve. The plug assembly further includes a plug shutter assembly located within the plug housing's cavity, adjacent to the plug housing's opening, and the receptacle assembly further includes a receptacle shutter assembly located within the receptacle housing's cavity, adjacent to the receptacle housing's opening. Both the plug shutter assembly and the receptacle shutter assembly are configured to be movable between a closed position, when the plug assembly and receptacle assembly are not mated with each other, and an open position, when the plug assembly and the receptacle assembly are mated with each other, and wherein both the plug shutter assembly and the receptacle shutter assembly function to seal their respective cavities, both in their closed positions and their open positions. The plug shutter assembly and the receptacle shutter assembly each include a first flexible layer, second flexible layer, first coupling ring, and second coupling ring. The first flexible layer has a plurality of slits formed therein, wherein, when the shutter assembly is in the closed position, the first flexible layer is substantially planar and the first flexible layer's slits meet at a first location. The second flexible layer has a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location. The first coupling ring is located adjacent to the first flexible layer, and the second coupling ring is located adjacent to the second flexible layer. Both the first and second flexible layers of each shutter assembly are located between the first and second coupling rings. The first and second coupling rings support the first and second flexible layers with a sealed space located behind the first and second flexible layers. The method further includes inserting the plug assembly into both the first and second pluralities of slits of the receptacle shutter assembly, maintaining a first seal between the plug assembly and the first and second layers of the receptacle shutter assembly, inserting the alignment sleeve into both the first and second pluralities of slits of the plug shutter assembly, and maintaining a second seal between the alignment sleeve and the first and second layers of the plug shutter assembly.

In other, more detailed features of the invention, the method further includes inserting the plug ferrule into the alignment sleeve, and aligning the plug ferrule with the receptacle ferrule.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
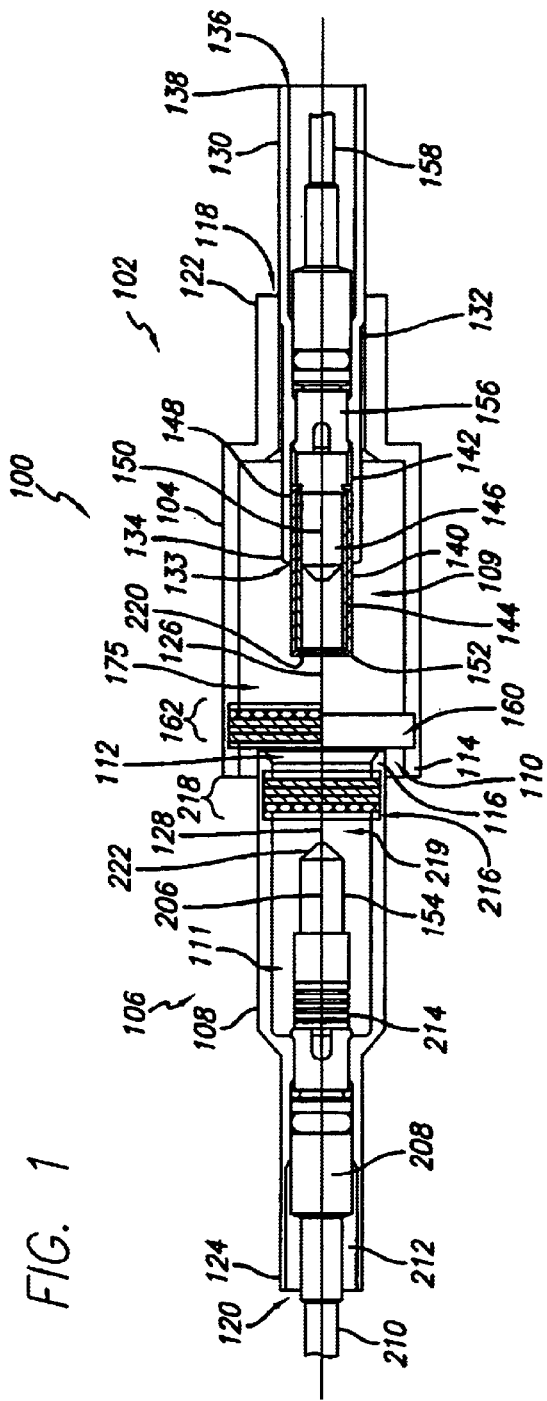
FIG. 1 is a sectional view of an optical connector pair according to a preferred embodiment, the optical connector pair being depicted in an unmated configuration.

The invention is embodied in shutter assemblies included in an optical connector pair. Each shutter assembly includes two or more resilient and flexible layers, which contain a plurality of radial slits and advantageously exclude contaminants, e.g., dust and dirt, from the interior of each optical connector. FIG. 1 is a sectional drawing illustrating a preferred embodiment of the optical connector pair 100, which includes a receptacle assembly 102 having a receptacle housing 104 and a plug assembly 106 having a plug housing 108. Both the receptacle housing and plug housing are cylindrical, and each defines a cavity 109 and 111, respectively, a circular shutter assembly opening 110 and 112, respectively, at one end 114 and 116, respectively, and a circular cable opening 118 and 120, respectively, at an opposite end 122 and 124, respectively, which lie along the same longitudinal axis 126 and 128, respectively. The outside diameters of the receptacle and plug housings are larger at the shutter assembly opening than at the cable opening. Similarly, the inside diameter of the receptacle and plug housings are larger at the shutter assembly opening than at the cable opening.

A receptacle sleeve 130 is inserted into, and connected to an interior surface 132 of the receptacle housing's cable opening 118. The receptacle sleeve is generally cylindrical, and has an alignment sleeve opening 133 at one end 134 and a cable opening 136 at an opposite end 138. A cylindrical alignment sleeve 140 is inserted into the alignment sleeve opening and is connected to an interior surface 142 of the receptacle sleeve so the alignment sleeve is inside of the receptacle housing 104 and the receptacle sleeve's cable opening is outside of the receptacle housing. The alignment sleeve opening and receptacle sleeve's cable opening both are circular and lie along a common axis 126. Within the alignment sleeve is a cylindrical collar insert 144.

A receptacle ferrule 146 is located generally coaxially within the cavity 109 of the receptacle assembly 102, within the collar insert 144, and positioned at an end 148 of the alignment sleeve 140 within the receptacle sleeve 130, recessed from the shutter assembly opening 110. The receptacle ferrule can be made of a ceramic material. The optical axis 150 of the receptacle ferrule is aligned with the axis 126 of the alignment sleeve and collar insert. The opposite end 152 of the alignment sleeve is open and designed to accept a plug ferrule 154 included in the plug housing 108. A receptacle interfacing collar 156 couples the receptacle ferrule to a first fiber-optic cable 158, which is inserted through the receptacle sleeve's cable opening 136. The receptacle interfacing collar is connected to the interior surface 142 of the receptacle sleeve.

Figure 2:
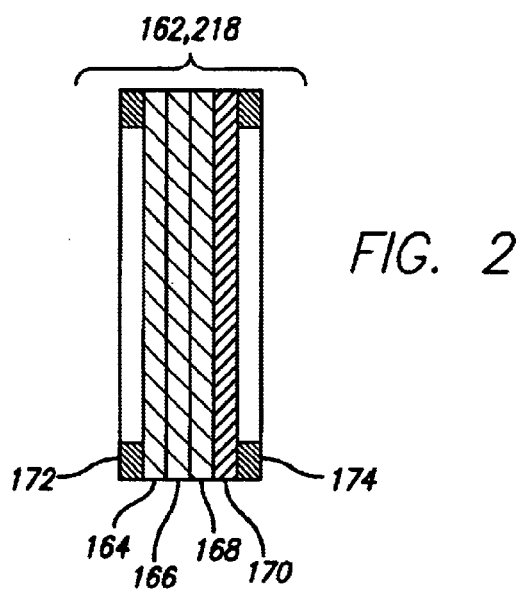
FIG. 2 is a sectional view of a shutter assembly included in the optical connector pair illustrated in FIG. 1.
Figure 3A:
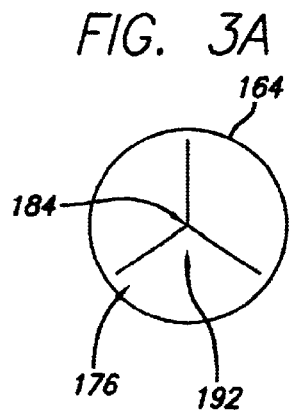
FIGS. 3A, 3B, 3C, and 3D are top plan views of layers included in the shutter assembly illustrated in FIGS. 1 and 2.
Figure 3B:
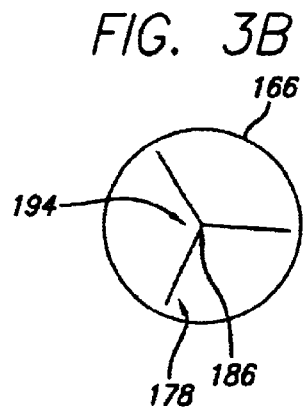
Figure 3C:
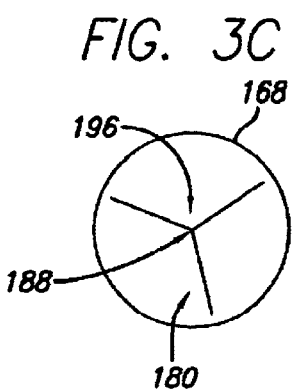
Figure 3D:
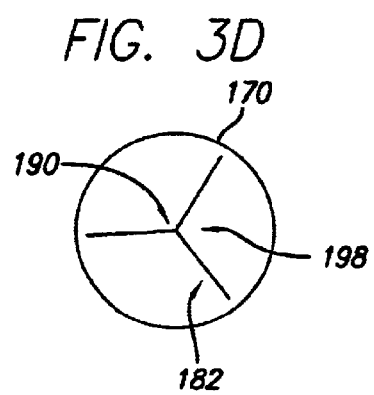

The interior surface 132 of the receptacle housing 104 includes a receptacle annular channel 160 located adjacent to the receptacle housing's one end 114. The receptacle annular channel receives a cylindrical receptacle shutter assembly 162. The receptacle shutter assembly illustrated in FIG. 1 is shown in greater detail in FIG. 2, which is a sectional view of the receptacle shutter assembly. The receptacle shutter assembly includes four circular layers 164, 166, 168, and 170 of flexible material located between two coupling rings 172 and 174 having an outside diameter approximately equal to the diameter of the four layers, which, in one embodiment, is approximately 0.360 inch. The coupling rings support the four circular layers, and a sealed space 175 is located behind the four circular layers. The circular layers are made of a flexible material, for example, high-resilience silicone rubber. Also, the coupling rings are made of a corrosion-resistant stainless steel.

In preferred embodiments, the receptacle shutter assembly's four circular layers 164–170 include a combination of three layers 164–168, each having a similar value of thickness, and a thicker fourth layer 170. In one embodiment, each of the first three layers ranges in thickness from approximately 0.010 inch to approximately 0.012 inch, and the thickness of the fourth layer is approximately 0.015 inch. Also, the shore hardness value for each of the first three layers ranges from approximately 65 to approximately 70, and the shore hardness value for the fourth layer ranges from approximately 75 to approximately 80. Because the fourth layer is thicker than the other three layers, the fourth layer is less resilient to displacement, and thus, provides a restoring force that tends to hold the three other layers in the closed position depicted in FIGS. 1 and 2.

FIGS. 3A, 3B, 3C, and 3D are top plan view drawings illustrating the first, second, third, and fourth circular layers 164, 166, 168, and 170, respectively, in closed positions. As shown in FIGS. 3A through 3D, each layer is substantially planar and has three slits 176, 178, 180, and 182, respectively, that extend radially from a location 184, 186, 188, and 190, respectively, which is not located at the center 192, 194, 196, and 198, respectively, of each circular layer. In particular, the slits in the first layer meet at a first location 184, which does not coincide with a first layer center 192, the slits in the second layer meet at a second location 186, which does not coincide with a second layer center 194, the slits in the third layer meet at a third location 188, which does not coincide with a third layer center 196, and the slits in the fourth layer meet at a fourth location 190, which does not coincide with a fourth layer center 198.

During manufacturing, the slits 176, 178, 180, and 182 are cut through each layer 164, 166, 168, and 170, respectively, using a die (not shown). Each slit is located approximately 120 degrees away from each of the other two slits relative to the location 184, 186, 188, and 190 where the slits meet. During the fabrication process for the receptacle shutter assembly 162, successive layers are rotated approximately 90 degrees relative to one another, and as a result, the location where the slits meet for one layer does not overlap with the locations where the slits meet in the other three layers. Therefore, referring additionally to FIG. 1, the first, second, third, and fourth locations are laterally spaced from one another in reference to the longitudinal axis 126 and 128 that is perpendicular to the first layer when the first layer is in the closed position.

Figure 4C:
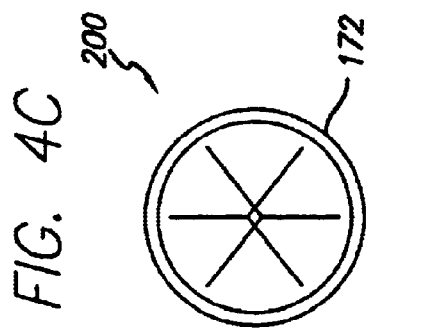
FIGS. 4A, 4B, and 4C are top plan views of a first layer, a third layer, and a coupling ring and the first layer, respectively, included in the shutter assembly illustrated in FIGS. 1 and 2.
Figure 4B:
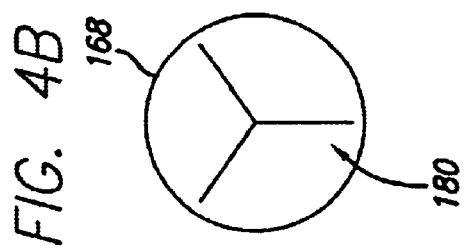
Figure 4A:
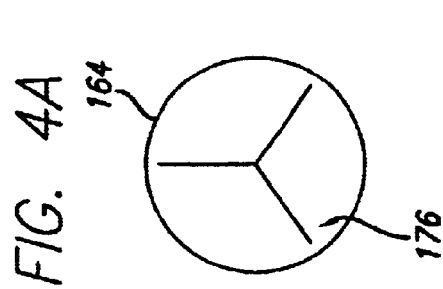

A top plan view of the first and third layers 164 and 168, respectively, and their overlap 200 is illustrated in FIGS. 4A, 4B, and 4C, respectively. As illustrated in FIGS. 4A and 4B, the third layer is rotated approximately 180 degrees relative to the first layer as indicated by the positions of the corresponding slits 176 and 180 in each layer. FIG. 4C illustrates that the locations of the first and third layers do not overlap. FIG. 4C also depicts a coupling ring 172 placed over the first layer.

While the discussion so far has focused on a receptacle shutter assembly 162 having four layers 164, 166, 168, and 170, it is to be understood that any number of layers greater than one could be used. Accordingly, a receptacle shutter assembly could be configured with n layers, where n is an integer greater than one. Also, the corresponding slits in immediately adjacent layers can be rotated approximately 360/n degrees away from one another. In addition, while each shutter assembly has been shown with three slits 176, 178, 180, and 182 that meet at a location 184, 186, 188, and 190, respectively, there can be more than three slits. Similar to the embodiments of the receptacle shutter assembly discussed previously, the location from which the slits radiate out is offset from the center 192, 194, 196, and 198 of each circular layer. Furthermore, the location of the slits in each layer can have a different position or orientation.

During fabrication of the receptacle shutter assembly 162, the coupling rings 172 and 174 and layers 164, 166, 168, and 170 are pressed together and cured in an oven (not shown). Each coupling ring is bonded to an adjacent layer, and each layer is bonded to adjacent layers using RTV-162, which is manufactured by General Electric Company located in Waterford, N.Y. Next, the coupling rings in combination with the layers are plasma etched. During the etching process, molecules are stripped from both the coupling rings and the layers, which improves the bond between the coupling rings and the layers. Accordingly, the compression during the curing process and the plasma etching process ensure a strong bond between a layer and either an adjacent layer or a coupling ring.

Figure 5B:
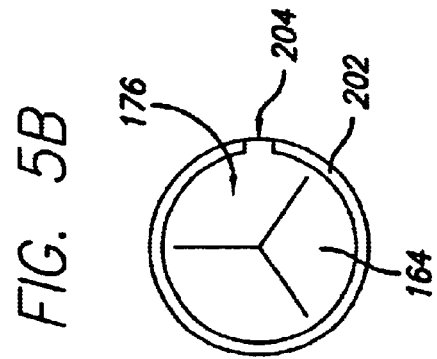
FIGS. 5A and 5B are top plan views of a coupling ring and underlying layer, and a c-shaped ring and underlying layer, respectively.
Figure 5A:
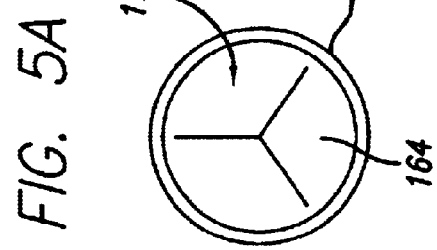

In other embodiments, instead of the receptacle shutter assembly 162 having circular coupling rings 172 and 174 as illustrated in FIGS. 4C and 5A, the receptacle shutter assembly includes c-shaped coupling rings 202 (only one shown). Each of the c-shaped coupling rings includes a gap 204 as shown in FIG. 5B. The c-shaped coupling ring configuration is advantageous in that a receptacle shutter assembly that includes the c-shaped coupling rings is more flexible than the shutter assembly having the circular coupling ring, and thus, the c-shaped coupling ring more easily can be inserted into the receptacle housing's annular channel 160.

Referring again to FIG. 1, an optic axis 206 of the plug ferrule 154 is aligned with the axis 128 of the cylindrical plug housing 108, and thus, the plug ferrule is located generally coaxially within the cavity 111 of the plug assembly 106, recessed from the shutter assembly opening 112. A plug interfacing collar 208 couples the plug ferrule to a second fiber-optic cable 210, which is inserted through the plug housing's cable opening 120. The plug interfacing collar is connected to an interior surface 212 of the plug housing. The plug interfacing collar includes a spring 214, which allows for movement of the plug ferrule relative to the second fiber-optic cable. Similar to the receptacle housing, the interior surface of the plug housing includes a plug annular channel 216 adjacent to the plug housing's one end 116. The plug annular channel receives a plug shutter assembly 218, which in one embodiment has an outside diameter equal to approximately 0.256 inch. Other than having a smaller diameter, the shape, components, number of components, and dimensions of the components in the plug shutter assembly are identical to that of the receptacle shutter assembly 162.

FIG. 1 illustrates the receptacle and plug assemblies 102 and 106, respectively, in an unmated configuration in which the receptacle housing's shutter assembly opening 110 is located adjacent to the plug housing's shutter assembly opening 112. As indicated in FIG. 1, both the receptacle and plug shutter assemblies 162 and 218, respectively, are in closed positions. Accordingly, the receptacle housing 104 in combination with the receptacle shutter assembly provides a sealed space 175 located behind the receptacle shutter assembly for the receptacle ferrule 146. Similarly, the plug housing 108 in combination with the plug shutter assembly 218 provide a sealed space 219 behind the plug shutter assembly for the plug ferrule 154. Thus, the receptacle and plug ferrules depicted in FIG. 1 are not exposed to contaminants from outside of each housing.

The receptacle and plug assemblies 102 and 106, respectively, are coupled together during an insertion process in which the end 116 of the plug housing 108 adjacent to the plug shutter assembly 218 is inserted through the three slits 176, 178, 180, and 182 in each of the receptacle shutter assembly's four layers 164, 166, 168, and 170, respectively, and moves the receptacle shutter assembly 162 into an open position. As the plug housing is inserted further toward the alignment sleeve 140, a first seal is maintained between the plug assembly and the receptacle shutter assembly's layers. The plug shutter assembly eventually contacts the alignment sleeve and moves the plug shutter assembly into an open position by pushing through the slits in each of the plug shutter assembly's four layers. Throughout further insertion of the alignment sleeve into the plug housing, a second seal is maintained between the alignment sleeve and the plug shutter assembly's layers.

Continued insertion of the plug housing 108 into the receptacle housing 104 results in the plug ferrule 154 entering the alignment sleeve 140 and collar insert 144 such that the plug ferrule's optical axis 206 aligns with the receptacle ferrule's optical axis 150. The alignment sleeve has a beveled edge 220 which contacts a sloped surface 222 of the plug ferrule and acts as a guide during the insertion of the plug ferrule into the alignment sleeve. The spring 214 in the plug interfacing collar 208 allows the plug ferrule to pivot, as needed, relative to the second fiber-optic cable 210 during insertion. The spring also biases the plug ferrule toward the receptacle ferrule 146 as the plug ferrule inserts into the alignment sleeve.

Figure 6:
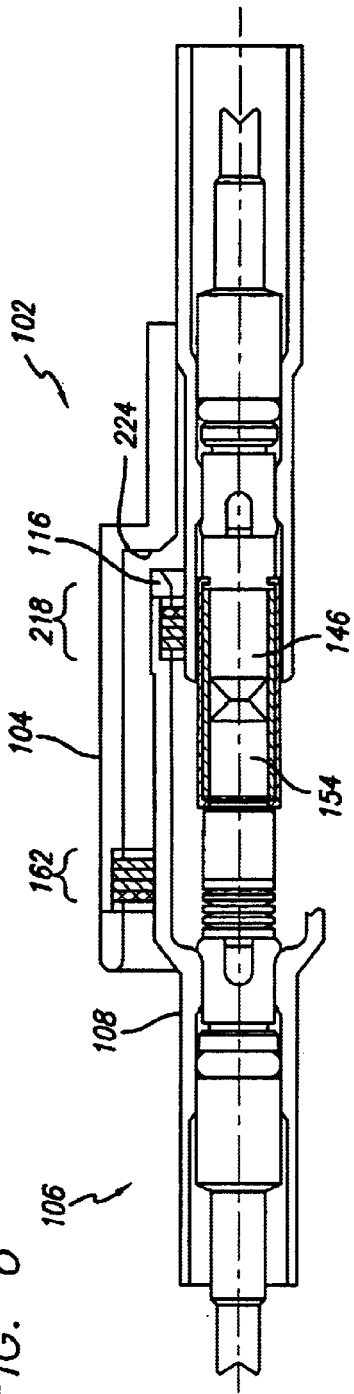
FIG. 6 is a partial sectional view of the optical connector pair illustrated in FIG. 1, the optical connector pair being depicted in a mated configuration.

When the receptacle and plug assemblies 102 and 106, respectively, reach a mated configuration, as illustrated in FIG. 6, both the receptacle and the plug shutter assemblies 162 and 218, respectively, are in open positions. The one end 116 of the plug housing 108 is adjacent to an interior surface 224 of the receptacle housing 104. The receptacle and plug ferrules 146 and 154, respectively, are located adjacent to one another, are in alignment with one another, and are optically engaged. Accurate alignment of the receptacle and plug ferrules is important in that it reduces optical losses resulting from misalignment.

In contrast, the receptacle and plug assemblies 102 and 106, respectively, can be moved from the mated configuration illustrated in FIG. 6 to an unmated configuration as illustrated in FIG. 1. Moving the plug assembly to the unmated position from the mated position results in the plug housing 108 being drawn out from the receptacle housing 104, and in doing so, the plug ferrule 154 is removed from the alignment sleeve 140 and collar insert 144. Next, the alignment sleeve leaves the slits 176, 178, 180, and 182 in the plug shutter assembly's four layers 164, 166, 168, and 170, respectively, and the plug shutter assembly 218 returns to its closed position. Then, the end 116 of the plug housing located adjacent to the plug shutter assembly is removed from the slits in the receptacle shutter assembly 162 and the receptacle shutter assembly returns to its closed position. The design of both the receptacle and plug shutter assemblies biases each shutter assembly into a closed position.

While FIGS. 1 and 6 depict a receptacle housing 104 connected to a first fiber-optic cable 158 and a plug housing 108 connected to a second fiber-optic cable 210, it should be understood that either or both of the receptacle and plug housings could be coupled to an optical device (not shown) rather than a fiber-optic cable. Thus, embodiments of the present invention, while not shown, could be used to interface a fiber-optic cable with components of an optical device, or could be used to interface two optical devices (not shown). Furthermore, the receptacle housing, receptacle sleeve 130, alignment sleeve 140, collar insert 144, receptacle ferrule 146, plug housing 108, plug ferrule 154, coupling rings 172 and 174, layers 164–170, shutter assembly openings 110 and 112, and cable openings 118 and 120 need not be cylindrically or circularly shaped.

Advantageously, both the receptacle and plug shutter assemblies 162 and 218, respectively, include at least two layers 164–170, having a plurality of slits, 176–182, respectively. The slits included in the plurality of slits meet at locations 184, 186, 188, and 190 that do not coincide with the centers 192, 194, 196, and 198, respectively, of each layer. Furthermore, the location where the slits meet in one layer does not overlap with other locations where slits meet in an adjacent layer. As a result, openings (not shown) formed between one layer's slits and the plug housing 108 or alignment sleeve 140 do not overlap with the openings (not shown) formed between an adjacent layer's slits and the plug housing or the alignment sleeve. Thus, the design of the shutter assemblies offers no single point of entry for contaminants into either the receptacle assembly 102 or the plug assembly 106. Furthermore, the receptacle and plug shutter assemblies open and close in a sequential manner, thus, further preventing the likelihood of contaminants entering the receptacle and plug assemblies and preventing the likelihood that a user would be exposed to light emitted from a ferrule 146 or 154.

Accordingly, the shutter assemblies 162 and 218 of the present invention prevent dust, dirt, and other contaminants from reaching the ferrules 146 and 154 contained within the receptacle and plug assemblies 102 and 106, respectively, during the insertion and removal processes. Thus, the need for removal of contamination from the ferrules is reduced because of the present invention. Also, because of the invention's design, the receptacle and plug ferrules never come into contact with either the receptacle shutter assembly 162 or the plug shutter assembly 218, rather, the plug housing 108 and alignment sleeve 140 contact the receptacle shutter assembly and the plug shutter assembly, respectively. The lack of contact between the ferrules and the shutter assemblies further reduces the likelihood of contaminants depositing on the ferrules and the likelihood of the ferrules being damaged. In addition to preventing contamination and damage to the ferrules, the invention also allows for the accurate alignment of the receptacle and plug ferrules. The present invention also advantageously allows for the quick mating and unmating of the optical connectors.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A shutter assembly into which an optical device is insertable, the shutter assembly configured to be moveable between a closed position, when the optical device is not inserted into the shutter assembly, and an open position, when the optical device is inserted into the shutter assembly, the shutter assembly comprising:

a first flexible layer having a plurality of slits formed therein, wherein, when the shutter assembly is in the closed position, the first flexible layer is substantially planar, a longitudinal axis perpendicularly passes through the first flexible layer, and the first flexible layer's slits meet at a first location;

a second flexible layer having a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location;

a first coupling ring located adjacent to the first flexible layer; and a second coupling ring located adjacent to the second flexible layer;

wherein both the first and second flexible layers are located between the first and second coupling rings, the first and second coupling rings support the first and second flexible layers with a scaled space located behind the first and second flexible layers, and both the first and second flexible layers form a seal with the optical device when the shutter assembly is in its open position.

2. The shutter assembly according to claim 1, wherein:

each of the slits included in the first flexible layer's plurality of slits extends radially from the first location; and each of the slits included in the second flexible layer's plurality of slits extends radially from the second location.

3. The shutter assembly according to claim 1, wherein both the first and second coupling rings are c-shaped.

4. The shutter assembly according to claim 1, wherein the shutter assembly is configured to exclude contaminants from the sealed space located behind the first and second flexible layers.

5. The shutter assembly according to claim 1, wherein the first and second flexible layers are made of high-resilience silicone rubber.

6. The shutter assembly according to claim 1, further comprising:
- a third flexible layer having a plurality of slits formed therein, wherein, when the shutter assembly is in a closed position, the third flexible layer is located adjacent to the second flexible layer, the third flexible layer is substantially planar, and the third flexible layer's slits meet at a third location, laterally spaced from both the first and second locations; and
- a fourth flexible layer having a plurality of slits formed therein, wherein, when the shutter assembly is in a closed position, the fourth flexible layer is located adjacent to the third flexible layer, the fourth flexible layer is substantially planar, and the fourth flexible layer's slits meet at a fourth location, laterally spaced from the first, second, and third locations;
- wherein the second coupling ring is located adjacent to the fourth flexible layer, the first, second, third, and fourth flexible layers are located between the first and second coupling rings, and the first and second coupling rings support the first, second, third, and fourth flexible layers with the sealed space located behind the first, second, third, and fourth flexible layers, and the first, second, third, and fourth flexible layers form the seal with the optical device when the shutter assembly is in its open position.

7. The shutter assembly according to claim 6, wherein:
- each of the slits included in the first flexible layer's plurality of slits extends radially from the first location;
- each of the slits included in the second flexible layer's plurality of slits extends radially from the second location;
- each of the slits included in the third flexible layer's plurality of slits extends radially from the third location; and
- each of the slits included in the fourth flexible layer's plurality of slits extends radially from the fourth location.

8. The shutter assembly according to claim 6, wherein both the first and second coupling rings are c-shaped.

9. An optical connector configured to be matable with an optical device, the optical connector comprising:
- a housing defining a cavity having a longitudinal axis and an opening, and further including a ferrule located generally coaxially within the cavity, recessed from the opening, wherein the ferrule optically engages the optical device when the optical connector mates with the optical device; and
- a shutter assembly located within the cavity, adjacent to the opening, wherein the shutter assembly is configured to be moveable between a closed position, when the optical connector and the optical device are not mated with each other, and an open position, when the optical connector and the optical device are mated with each other, and wherein the shutter assembly functions to seal the cavity, both in the closed and open positions;
- wherein the shutter assembly includes:
  - a first flexible layer having a plurality of slits formed therein, wherein, when the shutter assembly is in the closed position, the first flexible layer is substantially planar and the first flexible layer's slits meet at a first location, and
  - a second flexible layer having a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location,
  - a first coupling ring located adjacent to the first flexible layer, and
  - a second coupling ring located adjacent to the second flexible layer,
  - wherein both the first and second flexible layers are located between the first and second coupling rings, and the first and second coupling rings support the first and second flexible layers with a sealed space located behind the first and second flexible layers.

10. The optical connector according to claim 9, wherein:
- each of the slits included in the first flexible layer's plurality of slits extends radially from the first location; and
- each of the slits included in the second flexible layer's plurality of slits extends radially from the second location.

11. The optical connector according to claim 9, wherein both the first and second coupling rings are c-shaped.

12. The optical connector according to claim 9, wherein the shutter assembly is configured to exclude contaminants from the sealed space located behind the first and second flexible layers.

13. The optical connector according to claim 9, wherein the first and second flexible layers are made of high-resilience silicone rubber.

14. An optical connector pair comprising:
- a plug assembly including a plug housing defining a cavity having a longitudinal axis and an opening, and further including a plug ferrule located generally coaxially within the cavity, recessed from the plug housing's opening; and
- a receptacle assembly including a receptacle housing defining a cavity having a longitudinal axis and an opening, and further including a receptacle ferrule located generally coaxially within the cavity, recessed from the receptacle housing's opening;
- wherein the plug assembly and the receptacle assembly are configured to be matable with each other, with the plug ferrule optically engaging the receptacle ferrule;
- wherein the plug assembly further includes a plug shutter assembly located within the plug housing's cavity, adjacent to the plug housing's opening, and the receptacle assembly further includes a receptacle shutter assembly located within the receptacle housing's cavity, adjacent to the receptacle housing's opening;
- wherein both the plug shutter assembly and the receptacle shutter assembly are configured to be movable between a closed position, when the plug assembly and receptacle assembly are not mated with each other, and an open position, when the plug assembly and the receptacle assembly are mated with each other, and wherein both the plug shutter assembly and the receptacle shutter assembly function to seal their respective cavities, both in their closed positions and their open positions; and wherein the plug shutter assembly and the receptacle shutter assembly each include:
- a first flexible layer having a plurality of slits formed therein, wherein, when the shutter assembly is in the closed position, the first flexible layer is substantially planar and the first flexible layer's slits meet at a first location,
- a second flexible layer having a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location,
- a first coupling ring located adjacent to the first flexible layer, and
- a second coupling ring located adjacent to the second flexible layer,
- wherein both the first and second flexible layers are located between the first and second coupling rings, and the first and second coupling rings support the first and second flexible layers with a sealed space located behind the first and second flexible layers.

15. The optical connector pair according to claim 14, wherein:
- each of the slits included in the first flexible layer's plurality of slits extends radially the first location, and
- each of the slits included in the second flexible layer's plurality of slits extends radially from the second location.

16. The optical connector pair according to claim 14, wherein the first and second coupling rings for both the plug and receptacle shutter assemblies are c-shaped.

17. The optical connector pair according to claim 14, wherein the plug and receptacle shutter assemblies are configured to exclude contaminants from each shutter assembly's sealed space located behind the first and second flexible layers.

18. A method for interfacing an optical connector pair, the method comprising:
- providing a plug assembly including a plug housing defining a cavity having a longitudinal axis and an opening, and further including a plug ferrule located generally coaxially within the cavity, recessed from the plug housing's opening; and
- providing a receptacle assembly including a receptacle housing defining a cavity having a longitudinal axis and an opening, and further including an alignment sleeve and a receptacle ferrule located within the alignment sleeve generally coaxially within the cavity, recessed from the receptacle housing's opening;
- wherein the plug assembly and the receptacle assembly are configured to be matable with each other, with the plug ferrule optically engaging the receptacle ferrule within the alignment sleeve;
- wherein the plug assembly further includes a plug shutter assembly located within the plug housing's cavity, adjacent to the plug housings opening, and the receptacle assembly further includes a receptacle shutter assembly located within the receptacle housing's cavity, adjacent to the receptacle housing's opening;
- wherein both the plug shutter assembly and the receptacle shutter assembly are configured to be movable between a closed position, when the plug assembly and receptacle assembly are not mated with each other, and an open position, when the plug assembly and the receptacle assembly are mated with each other, and wherein both the plug shutter assembly and the receptacle shutter assembly function to seal their respective cavities, both in their closed positions and their open positions; and
- wherein the plug shutter assembly and the receptacle shutter assembly each include:
  - a first flexible layer having a plurality of slits formed therein, wherein, when the shutter assembly is in the closed position, the first flexible layer is substantially planar and the first flexible layer's slits meet at a first location,
  - a second flexible layer having a plurality of slits formed therein, wherein, when the shutter assembly is in the closed position, the second flexible layer is located adjacent to the first flexible layer, the second flexible layer is substantially planar, and the second flexible layer's slits meet at a second location, laterally spaced from the first location,
  - a first coupling ring located adjacent to the first flexible layer, and
  - a second coupling ring located adjacent to the second flexible layer,
  - wherein both the first and second flexible layers of each shutter assembly are located between the first and second coupling rings, and the first and second coupling rings support the first and second flexible layers with a sealed space located behind the first and second flexible layers,
- inserting the plug assembly into both the first and second pluralities of slits of the receptacle shutter assembly;
- maintaining a first seal between the plug assembly and the first and second layers of the receptacle shutter assembly;
- inserting the alignment sleeve into both the first and second pluralities of slits of the plug shutter assembly; and
- maintaining a second seal between the alignment sleeve and the first and second layers of the plug shutter assembly.

19. The method according to claim 18, further comprising inserting the plug ferrule into the alignment sleeve.

20. The method according to claim 19, further comprising aligning the plug ferrule with the receptacle ferrule.

* * * * *

UNITED STATES PATENT AND TRADEMARK OFFICE
CERTIFICATE OF CORRECTION

PATENT NO. : 6,811,318 B1
DATED : November 2, 2004
INVENTOR(S) : Hollis et al.

It is certified that error appears in the above-identified patent and that said Letters Patent is hereby corrected as shown below:

Column 10,
Line 59, delete "scaled" and insert -- sealed -- therefor.

Column 13,
Line 31, delete "location, and" and insert -- location; and -- therefor.

Column 14,
Line 3, delete "housings" and insert -- housing's -- therefor.

Signed and Sealed this

Twenty-third Day of August, 2005

JON W. DUDAS
*Director of the United States Patent and Trademark Office*